United States Patent
Roosli et al.

(10) Patent No.: US 11,263,711 B2
(45) Date of Patent: Mar. 1, 2022

(54) REVOCABLE CERTIFICATES FOR GUESTROOM ACCESS AND GUESTROOM CONTROLS BY MOBILE DEVICES

(71) Applicant: Honeywell International Inc., Morris Plains, NJ (US)

(72) Inventors: Philipp A. Roosli, Niantic, CT (US); Brendan H. Donecker, East Lyme, CT (US); Michael Asmussen, New London, CT (US)

(73) Assignee: Honeywell International Inc., Charlotte, NC (US)

( * ) Notice: Subject to any disclaimer, the term of this patent is extended or adjusted under 35 U.S.C. 154(b) by 552 days.

(21) Appl. No.: 15/928,590

(22) Filed: Mar. 22, 2018

(65) Prior Publication Data
US 2019/0295195 A1 Sep. 26, 2019

(51) Int. Cl.
*G06Q 50/12* (2012.01)
*G06Q 10/02* (2012.01)
(Continued)

(52) U.S. Cl.
CPC ............ *G06Q 50/12* (2013.01); *G06Q 10/02* (2013.01); *H04L 9/3268* (2013.01); *H04L 63/0823* (2013.01); *H04W 12/06* (2013.01)

(58) Field of Classification Search
CPC ........ G06Q 10/02; G06Q 50/12; H04W 12/04
(Continued)

(56) References Cited

U.S. PATENT DOCUMENTS

2003/0208386 A1* 11/2003 Brondrup .......... H04W 12/0013
   705/5
2007/0176739 A1* 8/2007 Raheman ........... G07C 9/00904
   340/5.64
(Continued)

FOREIGN PATENT DOCUMENTS

| CN | 104483937 A | 4/2015 |
| EP | 1493131 A2 | 1/2005 |
| JP | 2006188922 A | 7/2006 |

OTHER PUBLICATIONS

Zhong et al., "Study on the IOT Architecture and Gateway Technology", 2015 14th International Symposium on Distributed Computing and Applications for Business Engineering and Science (Year: 2015).*

*Primary Examiner* — Emmett K. Walsh
(74) *Attorney, Agent, or Firm* — Seager, Tufte & Wickhem LLP

(57) ABSTRACT

A system or arrangement of room control with a mobile device by a guest at a hotel, motel, or the like. When a reservation system assigns a guest to a room in, for instance a hotel, the reservation system may request a security certificate from a server that manages a control system in the room. The certificate may be transmitted to the guestroom control equipment and room reservation system. The certificate may be pushed to a mobile device of the guest. Also a key credential may be pushed to the mobile device for room access. The certificate may indicate the date/time period where the certificate is valid and functional aspects that the certificate can support relative to the room. When a guest goes to the room, the mobile device may link up with the control equipment in the room. Both entities having the same certificate can mutually authenticate each other.

21 Claims, 1 Drawing Sheet

(51) Int. Cl.
*H04W 12/06* (2021.01)
*H04L 9/32* (2006.01)
*H04L 29/06* (2006.01)

(58) Field of Classification Search
USPC .......................................................... 705/5
See application file for complete search history.

(56) References Cited

U.S. PATENT DOCUMENTS

| | | | |
|---|---|---|---|
| 2009/0066476 A1* | 3/2009 | Raheman | G07C 9/00571 |
| | | | 340/5.64 |
| 2012/0310415 A1 | 12/2012 | Raestik et al. | |
| 2013/0346564 A1* | 12/2013 | Warrick | H04L 65/60 |
| | | | 709/219 |
| 2014/0074537 A1* | 3/2014 | Bargetzi | G06Q 10/02 |
| | | | 705/7.19 |
| 2016/0043866 A1* | 2/2016 | Nixon | G05B 19/41855 |
| | | | 713/168 |
| 2016/0044472 A1* | 2/2016 | Person | H04W 4/14 |
| | | | 705/5 |
| 2016/0139573 A1* | 5/2016 | Soni | H04L 63/10 |
| | | | 700/275 |
| 2017/0005945 A1* | 1/2017 | Kumar | H04N 21/478 |
| 2017/0041146 A1* | 2/2017 | Davis | H04L 9/0872 |
| 2018/0005468 A1* | 1/2018 | Hamilton, II | G07C 9/28 |
| 2018/0034913 A1* | 2/2018 | Matthieu | H04W 8/22 |
| 2018/0084424 A1* | 3/2018 | Sonasath | H04W 12/0608 |
| 2018/0239616 A1* | 8/2018 | Moattar-Aliabadi | G06F 9/452 |
| 2018/0262388 A1* | 9/2018 | Johnson | G06F 9/448 |
| 2019/0057323 A1* | 2/2019 | Caffo | G06Q 10/06314 |

\* cited by examiner

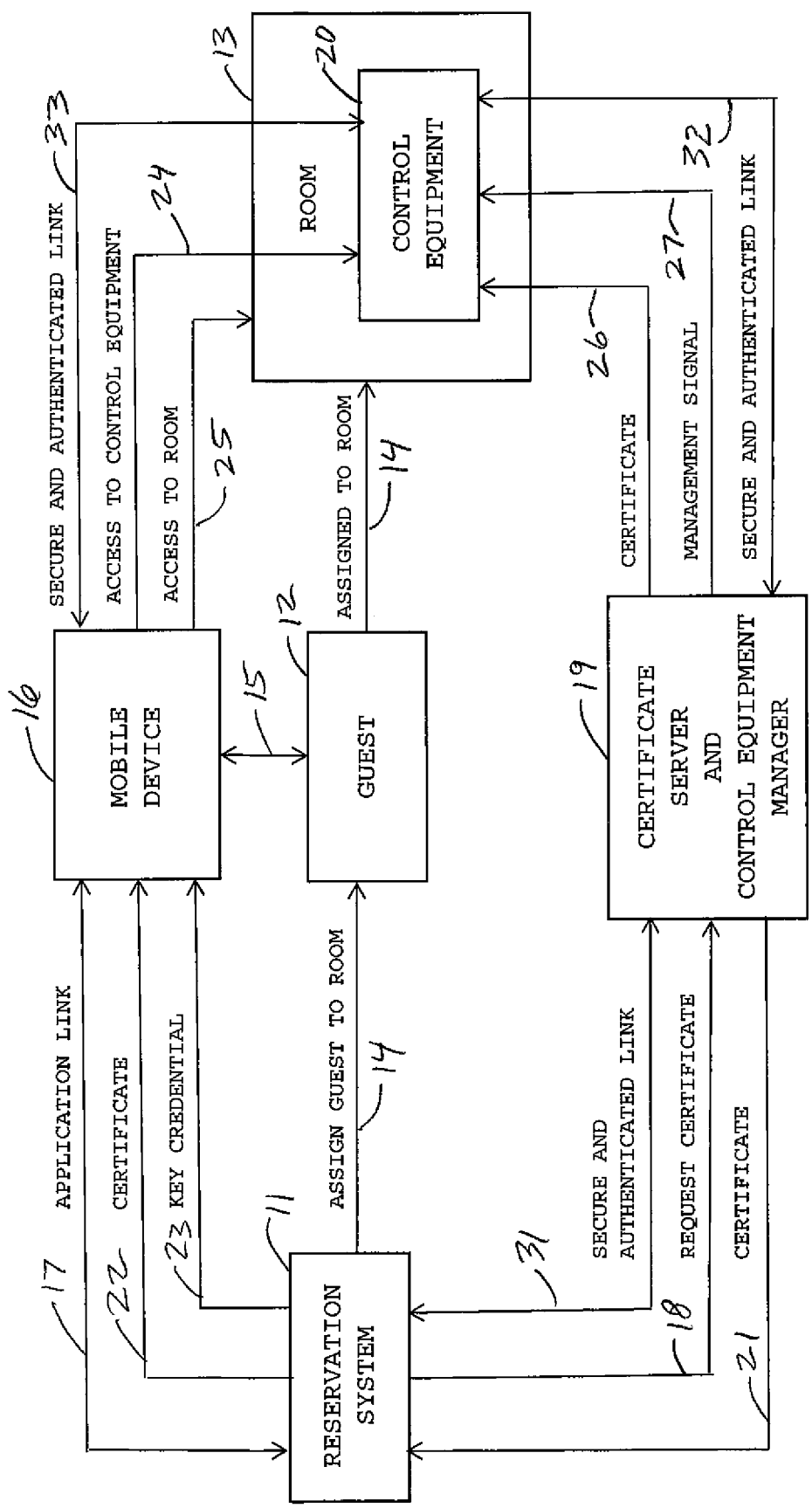

REVOCABLE CERTIFICATES FOR GUESTROOM ACCESS AND GUESTROOM CONTROLS BY MOBILE DEVICES

BACKGROUND

The present disclosure pertains to guestroom rental of multiunit places or any type of short-term rental lodging services and particularly to interactions of guests with such places.

SUMMARY

The disclosure reveals a system or arrangement of guestroom control with a mobile device by a guest at a hotel, motel, or like multi-dwelling building or short-term rental lodging services. When a reservation system assigns a guest to a room in, for instance a hotel, the reservation system may request a security certificate from a server that manages a control system in the room. The certificate may be transmitted to the control equipment of the room and to the reservation system that in turn may push the certificate to a mobile device of the guest. This operation can be combined with a key credential ('keyless entry' type key credential for electronic locks or any type of access system) being pushed to the mobile device for room access. The certificate may indicate the date/time period where the certificate is valid and functional aspects that the certificate can support relative to the room. If a guest goes to the room, the mobile device may link up with the room control equipment. Both entities having the same certificate may mutually authenticate each other.

BRIEF DESCRIPTION OF THE DRAWING

FIG. 1 is a diagram of an example interaction of a guest having a mobile device with a hotel, motel, other multiple unit place of rental space, or a short-term rental lodging service.

DESCRIPTION

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

Aspects of the system or approach may be described in terms of symbols in the drawing. Symbols may have virtually any shape (e.g., a block) and may designate hardware, objects, components, activities, states, steps, procedures, and other items.

Many guests, for instance in hotels, travel with one or multiple mobile devices that may operate with peer-to-peer connections with their environment, such as Bluetooth, ZigBee, Wi-Fi direct, or the like. Applications running on such mobile devices may be used to operate the controls equipment in guestrooms, such as lights, HVAC, TV, drapes, security, locks, sound systems, privacy settings, kitchen appliances, and other mechanisms and components. It is desirable that there be little or no configuration steps needed by the visiting guest to link his or her mobile device with the guestroom. Other linking methods may require one to pair the devices and often enter pin codes. This complexity may hinder smooth deployment of the mobile device as a controller of guestroom features.

When the reservation system assigns a guest to a room in a hotel or in a short-term rental lodging marketplace, the reservation system may request a cyber security certificate from a server that manages the control system in the room. A short-term rental may be, have a range, or vary from one day to one year. Such certificate, essentially a crypto random number of significant length (e.g., 256 bits) may be transmitted to the guestroom equipment and also sent to the room reservation system. The room reservation system may push the certificate to the mobile device of the guest. The operation may be combined with pushing a key credential ('keyless entry' key for electronic locks) to the mobile device for gaining access to the room door. The certificate that is sent to the room control equipment may further contain meta information that informs the room equipment of the date/time period where the certificate is valid and what functional aspects the certificate can support. This meta information may be used by the room equipment to manage the certificate (e.g., a deletion after expiration of the certificate), to perform checks on commands that are being received from the mobile device, and to filter attributes that are being sent to the mobile device (e.g., to manage data privacy aspects of the application).

If a guest goes to the room, the mobile device may link up with the room control equipment and because both entities contain the same certificate, they can use this element to mutually authenticate each other. An advantage of such a certificate may be that if a guest checks-out early or does not like a room and thus is assigned a different room, the certificate may be erased and will prevent a mobile device of a former guest from establishing an application link. Another advantage may be that if during the stay the guest opts in or opts out of having access to certain appliances and/or equipment in the room (e.g., minibar) the reservation system can update the certificate for both the mobile device and the room control equipment dynamically reestablishing the most current attributes.

A key of the present application may be providing secure and authenticated communication links between the certificate server and the reservation system, and the certificate server and control equipment of the guest room.

FIG. 1 is a diagram of an example interaction of a guest with a hotel, motel, or other multiple-unit place of rental space with a mobile device such as a smartphone, and the like. A reservation system 11 of, for example, a hotel, may assign according to line 14 a guest 12 to a room 13 at the hotel. Guest 12 may have an interaction 15 with a mobile device 16. An application link 17 may be established between reservation system 11 and mobile device 26 by guest 15.

Link 17 may accommodate transmission of signals between mobile device 16 and reservation system 11. Similarly, with links 31, 32 and 33, the respective links between reservation system 11 and certificate server and control equipment manager 19, between the certificate server and control equipment manager 19 and control manager, and between control equipment 20 and mobile device 16, may accommodate transmission of signals of the corresponding lines and connections associated with the respective entities or components. Reservation system 11 may request, for instance, a cyber security certificate indicate by line 18 to a certificate server and control equipment manager 19. In response, the certificate may be transmitted to reservation system 11 according to line 21 and also sent in view of line 26 to control equipment 20 of room 13. Reservation system 11 may push the certificate in view of line 22 to mobile device 16. The providing the certificate to mobile device 16 may be accompanied with pushing a key credential to mobile device 16 in light of line 23. The certificate may let mobile device 16 have access to control equipment 20 according to line 24, and the key credential may let mobile device 16 and guest 12 have access to room 13 in view of line 25.

Certificate server and control equipment manager 19 may provide the same certificate to control equipment 20 as indicated with line 26, as the certificate to reservation system 11 and mobile device 16. One or more management signals may be provided as noted by line 27 to control equipment 20. The certificate server and the control equipment manager 19, along with their respective lines and connections, may be split and treated as separate entities.

Application link 17 may accommodate transmission of the certificate and the key credential in view of lines 22 and 23, respectively. Similarly, secure and authenticated link 31 may accommodate the certificate request and the transmission of the certificate as noted by lines 18 and 21, respectively. Secure and authenticated link 32 may accommodate a transmission of the certificate and one or more management signals according to lines 26 and 27, respectively. Secure and authenticated link 33 may accommodate achieving a connection for access to control equipment 20 and room 13 in view of lines 24 and 25, respectively.

The present approach may have application to short-term rentals like AirBn™ and the likes, that is, pretty much any application that involves a reservation system granting guests access and control of devices in a rentable space (guestroom or a house or part of a house being rented out) using a mobile device.

The term "room" or "guestroom" as used herein may refer to a living space in a hotel, motel, multi-dwelling building, house, apartment, and other structures. Either term may be used herein; however, "room" may be often used in lieu of "guestroom".

To recap, a guestroom assignment arrangement may incorporate a mobile device; a reservation system that assigns a room or a house to a guest having use of the mobile device; and a certificate requested by the reservation system from a service unit that manages control equipment in the room or house, to be sent to the reservation system and the control equipment, and a key credential that is pushed to the mobile device for gaining access to the room or house. When the guest with the mobile device goes to the room or house, the mobile device may link up with the control equipment.

The mobile device and the control equipment may contain the same certificates. The same certificates may enable the mobile device and the control equipment to authenticate each other.

If the guest checks out early from the room or leaves the room or house for another assigned room or house, the certificate may be invalidated to prevent the guest from establishing an application link with the room or house checked out from the room or house, or left by the guest having the mobile device.

The guest, upon linking the mobile device with the control equipment of the room or house may, with the mobile device, operate equipment the control equipment in the room or house such as for lights, HVAC, TV, sound systems, drapes, locks, privacy settings, and kitchen appliances.

There may be a secure and authenticated link between the service that provides the certificate and the reservation system. There may be a secure and authenticated link between the service that provides the certificate and the control equipment of the room.

The certificate may be a cyber security certificate.

The certificate may be a crypto random number.

An approach for room control using a mobile device, may incorporate assigning a guest to a room through a reservation system, requesting a certificate from a management service server with the reservation system, sending the certificate to control equipment for a room, and to the reservation system, and sending a key credential for access to the room to a mobile device of the guest.

The certificate may indicate the time period and place for which the certificate is valid.

The certificate may indicate functionalities, attributes or features that it supports.

The functionalities, attributes or features that the certificate supports may incorporate one or more items selected from a group having lights, HVAC, TV, sound systems, drapes, locks, privacy settings, and kitchen appliances. The term "attributes" may be used often herein in lieu of "functionalities" and "features". Those attributes may be dynamically changed and updated during the guest's stay by having the reservation system request an updated certificate with the new attributes that in turn gets pushed to the mobile device and room control equipment.

The approach may further incorporate going to the room with the mobile device, where the mobile device links up with the control equipment of the room.

The mobile device and the control equipment may have the same certificates and thus can mutually authenticate each other.

If the guest checks out early or is assigned a different room, the certificate associated with the mobile device of the guest, may be revoked to prevent the mobile device from establishing an application link with the control equipment of the room.

A system for room control may incorporate a reservation system, control equipment for a room, one or more mobile devices, and a management service unit. The reservation system may request a certificate from the management service unit. The certificate may be transmitted to the control equipment and the reservation system. The certificate may be pushed by the reservation system to the one or more mobile devices.

A key credential may be pushed by the reservation system to the one or more mobile devices for gaining access to the room.

The certificate transmitted to the control equipment may inform the control equipment the time and place of the validity of the certificate and attributes supported by the certificate.

The control equipment may delete the certificate when the certificate expires.

The control equipment may perform checks on commands from the one or more mobile devices.

The control equipment filter attributes may be sent to the one or more mobile devices.

Any publication or patent document noted herein is hereby incorporated by reference to the same extent as if each publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A guestroom assignment arrangement comprising:
   a mobile device;
   a reservation system that assigns a room to a guest having use of the mobile device;
   a service unit, the service unit is configured to issue secure certificates and manage control equipment in the room;
   a key credential, the key credential is configured to give the guest access to the room via the mobile device; and
   a certificate, the certificate is issued by the service unit in response to a request by the reservation system and provides access to control equipment in the room via the mobile device; and
   wherein:
   in response to receiving the request for the certificate from the reservation system, the service unit sends the certificate to the reservation system and to the control equipment in the room;
   the reservation system is configured to send the certificate and the key credential to the mobile device; and
   when the guest with the mobile device goes to the room and the certificate at the mobile device matches the certificate at the control equipment, the mobile device can link up with the control equipment.

2. The arrangement of claim 1, wherein:
   the mobile device and the control equipment contain the same certificates; and
   the same certificates enable the mobile device and the control equipment to authenticate each other.

3. The arrangement of claim 2, wherein if the guest checks out early from the room or leaves the room for another assigned room, the certificate is invalidated to prevent the guest from establishing an application link with the room checked out from the room or left by the guest having the mobile device.

4. The arrangement of claim 1, wherein the guest, upon linking the mobile device with the control equipment of the room can, with the mobile device, operate the control equipment in the room selected from a group consisting of lights, HVAC, TV, sound systems, drapes, privacy settings, kitchen appliances, security equipment, and combinations thereof.

5. The arrangement of claim 1, wherein:
   there is a secure and authenticated link between the service that provides the certificate and the reservation system; and
   there is a secure and authenticated link between the service that provides the certificate and the control equipment of the room.

6. The arrangement of claim 2, wherein the certificate is a cyber security certificate.

7. The arrangement of claim 2, wherein the certificate is a crypto random number.

8. A method for room control using a mobile device, comprising:
   assigning a guest to a room through a reservation system;
   the reservation system requesting a certificate from a management service server with the reservation system;
   in response to receiving the request for the certificate, the management server sending the certificate to control equipment for the room and to the reservation system; and
   the reservation system sending the certificate and a key credential for access to the room to a mobile device of the guest.

9. The method of claim 8, wherein the certificate indicates the time period and place for which the certificate is valid.

10. The method of claim 8, wherein the certificate indicates attributes that the certificate supports.

11. The method of claim 10, the attributes that the certificate supports selected from a group consisting of lights, HVAC, TV, drapes, sound systems, security components, privacy settings, kitchen appliances, and combinations thereof.

12. The method of claim 11, further comprising going to the room with the mobile device, where the mobile device links up with the control equipment of the room.

13. The method of claim 12, wherein the mobile device and the control equipment have the same certificates and thus can mutually authenticate each other.

14. The method of claim 9, wherein if the guest checks out early or is assigned a different room, the certificate associated with the mobile device of the guest is revoked to prevent the mobile device from establishing an application link with the control equipment of the room.

15. The method of claim 10, wherein if the guest opts-in or opts-out of certain attributes during a stay, the certificate associated with the mobile device of the guest is updated to reflect a new set of attributes.

16. A system for room control comprising:
    a reservation system;
    control equipment for a room;
    one or more mobile devices; and
    a management service unit; and
    wherein:
    the reservation system requests a certificate from the management service unit;
    the certificate is configured to be dynamically updated to change control equipment access via the one or more mobile devices during a user's stay in the room;
    the certificate is transmitted to the control equipment and the reservation system; and
    the certificate is pushed by the reservation system to the one or more mobile devices.

17. The system of claim 16, wherein a key credential is pushed by the reservation system to the one or more mobile devices for gaining access to the room.

18. The system of claim 16, wherein the certificate transmitted to the control equipment informs the control equipment the time and place of the validity of the certificate and attributes supported by the certificate.

19. The system of claim 18, wherein the control equipment deletes the certificate when the certificate expires.

20. The system of claim 18, wherein the control equipment performs checks on commands from the one or more mobile devices.

21. The system of claim 18, wherein the control equipment filters attributes sent to the one or more mobile devices.

* * * * *